United States Patent
Kuse

(10) Patent No.: US 9,802,862 B2
(45) Date of Patent: Oct. 31, 2017

(54) CO$_2$ EMISSION-FREE CONSTRUCTION MATERIAL MADE OF CO$_2$

(71) Applicant: Kolja Kuse, München (DE)

(72) Inventor: Kolja Kuse, München (DE)

(*) Notice: Subject to any disclaimer, the term of this patent is extended or adjusted under 35 U.S.C. 154(b) by 583 days.

(21) Appl. No.: 13/894,502

(22) Filed: May 15, 2013

(65) Prior Publication Data

US 2013/0273381 A1    Oct. 17, 2013

Related U.S. Application Data

(63) Continuation-in-part of application No. 13/143,193, filed as application No. PCT/EP2009/008497 on Nov. 27, 2009, now abandoned.

(30) Foreign Application Priority Data

Nov. 27, 2008  (DE) .................... 20 2008 015 775 U

(51) Int. Cl.
  *D01F 9/16*    (2006.01)
  *C04B 14/38*   (2006.01)
  *C04B 16/06*   (2006.01)
  *D01F 6/60*    (2006.01)
  *D01F 9/00*    (2006.01)
  *E04C 5/07*    (2006.01)

(52) U.S. Cl.
  CPC ........ *C04B 14/386* (2013.01); *C04B 16/0691* (2013.01); *D01F 6/605* (2013.01); *D01F 9/00* (2013.01); *D01F 9/16* (2013.01); *E04C 5/073* (2013.01); *Y10T 428/31725* (2015.04)

(58) Field of Classification Search
  CPC ....... C04B 14/38; C04B 16/06; C04B 14/386; C04B 16/0691; D01F 9/16; D01F 6/605
  See application file for complete search history.

(56) References Cited

U.S. PATENT DOCUMENTS 2,760,920 A * 8/1956 Olsen ................ C10B 23/00
                                                       126/681
3,547,584 A * 12/1970 Santangelo ........... D01F 9/28
                                                       264/DIG. 19
3,940,429 A   2/1976 McConaghy et al.
(Continued)

FOREIGN PATENT DOCUMENTS

DE      102007016201 A1   10/2008
DE    10 20080 21011 A1   10/2009
(Continued)

OTHER PUBLICATIONS

English Abstract of Application DE 10 20080 21011 A1.
First Office Action in corresponding Application CN 2009/801552849, Dec. 12, 2012.
(Continued)

*Primary Examiner* — Matthew Daniels
(74) *Attorney, Agent, or Firm* — Cahn & Samuels, LLP

(57) ABSTRACT

Building materials and methods of making a building material are disclosed. An exemplary method includes receiving algae; and subjecting the algae to an oil extraction process, in order to produce vegetable oil. The method further includes producing synthetic fibers by processing the vegetable oil from the oil extraction process; and processing the synthetic fibers to produce a tension and pressure resistant material.

7 Claims, 2 Drawing Sheets

(56) References Cited

U.S. PATENT DOCUMENTS

| | | | | |
|---|---|---|---|---|
| 4,000,733 | A * | 1/1977 | Pauly | F24J 2/06 |
| | | | | 126/680 |
| 4,020,145 | A * | 4/1977 | Soehngen | D01F 9/21 |
| | | | | 264/29.2 |
| 2002/0071932 | A1 * | 6/2002 | Wheatley | B29C 73/10 |
| | | | | 428/108 |
| 2007/0048848 | A1 * | 3/2007 | Sears | C12M 23/20 |
| | | | | 435/134 |
| 2008/0245269 | A1 | 10/2008 | Forth et al. | |
| 2010/0047153 | A1 * | 2/2010 | Plee | D01F 9/22 |
| | | | | 423/447.2 |

FOREIGN PATENT DOCUMENTS

| | | |
|---|---|---|
| EP | 0078000 A1 | 5/1983 |
| EP | 1062092 A1 | 12/2000 |
| JP | S54156821 A | 12/1979 |
| JP | S6257925 A | 3/1987 |
| JP | 2008095257 A | 4/2008 |
| WO | 2005082434 A2 | 9/2005 |
| WO | 2016113140 A1 | 7/2016 |

OTHER PUBLICATIONS

English Translation of First Office Action of CN 2009/801552849.
Introduction Mineral Composite Technology, from www.technocarbon.com.
English Abstract of JP S54156821.
Partial machine translation of Detailed Description of JP 54156821.
English Abstract of JP S6257925.
English Abstract of JP 2008095257.
English Abstract of WO 2016113140.
"Glycerol" from Wikipedia, https://en.wikipedia.org/wiki/Glycerol, printed on or about Aug. 4, 2016.
"Carbon Fibers" from Wikipedia, https://en.wikipedia.org/wiki/Glycerol, printed on or about Aug. 4, 2016.
"Polyacrylonitrile" from Wikipedia, https://en.wikipedia.org/wiki/Glycerol, printed on or about Aug. 4, 2016.
English Abstract of WO 2005082434.
English Abstract of DE 102007016201.
Chinese Office Action, Chinese Patent Application 200980155284.9, dated Dec. 2012.
Han, Xiaotian et al., "An appliation prospect of biodiesel from marine microalgae", Marine Sciences, No. 8, 76-81, 2008.

* cited by examiner

CO₂ EMISSION-FREE CONSTRUCTION MATERIAL MADE OF CO₂

This Application is a continuation-in-part of International Patent Application PCT/EP2009/008497 of KUSE, Kolja filed 27 Nov. 2009 (U.S. National Phase Ser. No. 13/143,193), for CO2 EMISSION-FREE CONSTRUCTION MATERIAL MADE OF CO2, the contents of which are herein incorporated by reference; which claims priority to 20 2008 015 775.7 filed 27 Nov. 2008, the contents of which are herein incorporated by reference.

The present invention relates to a production practice of $CO_2$-emissions neutral, or $CO_2$-emissions-free respectively, building materials. In a second step $CO_2$ shall be even removed from the atmosphere by the process of energy production being necessary for the production of the building material and permanently be bound in the building materials.

The process is being described based on a new, previously unknown material flow. In front of the background of nowadays not disclaimed happening global warming, it is important to optimize in particular those processes which require a lot of production energy. A significant energy sink is the production of materials having high pressure and tensile strength at the same time such as concrete, steel reinforced concrete, steel, glass and aluminum.

Without these materials, industrial manufacturing of necessary facilities and consumer goods of a modern living standard, such as buildings, vehicles and machinery are currently not imaginable.

The production of these materials, which are artificially created by man, needs indeed large amounts of energy, which currently can only be obtained by a sufficient extent of fossil burning.

Thereby large amounts of $CO_2$ are being released, accelerating the long term climate change by heating up the atmosphere in such a way that the climate system is threatening to generate intolerable living conditions on planet Earth or even turn around completely, in case the $CO_2$-emissions will not be slowed down and be permanently brought down to almost zero, respectively—at a certain level of concentration of $CO_2$ in the atmosphere—a reduction of $CO_2$ from the atmosphere is becoming necessary in order to come close to the climate target for example to go not beyond a warming limit of 2° C. by year 2100 and then, ideally, get back step by step down to preindustrial levels again.

Embodiments of the present invention therefore offer a procedure to produce pressure and tension stable materials in a $CO_2$-neutral way, and if necessary to remove $CO_2$ continuously over long periods from the atmosphere again through their own production. Recently, we succeeded to separate $CO_2$ from flue gas in fossil-fueled power plants. This $CO_2$ is being discharged for example into vessels with salt water, in which algae growth is being stimulated through photosynthesis.

The algae absorb the carbon very quickly, faster than plants growing in air, releasing precious oxygen. From the algae it is easily possible to win oil.

The essence of embodiments of the present invention is based on the idea to use that oil as raw material, in order to produce synthetic fibers.

These synthetic fibers may be of such nature that they are further processed inter alia into coal fibers or carbon fibers or aramid fibers.

The necessary energy for the $CO_2$-sequestration, the production of the fibers and the needed pressure-resistant material components, such as natural stone and the other needed energies for the production of the algae oil are being derived from conventional power plants burning fossil fuels and/or renewable fuels such as biodiesel and other renewable energy sources like solar, wind and hydroelectric power stations, with a surplus of that energy contributing to other generally needed power supply.

The carbon, which did previously cause the $CO_2$-problem, is now tied into the building material of carbon fiber or aramid fiber.

The $CO_2$-neutrally produced, tension stable carbon fibers and aramid fibers are able—in cooperation with pressure-resistant materials such as natural stone—to replace the currently used tension and pressure resistant conventional building materials such as concrete, steel and aluminum.

By combining the fiber of high tensile strength with compression resistant materials that nature provides in the form of natural stone, available in unlimited quantities without a lot of energy expenditure, the required amount of carbon fiber or aramid fiber is significantly reduced.

The resulting building material is henceforward based only on the primary materials of salt water, carbon and natural stone, the energy source for the production of the building materials in the medium term is based on fossil burning and the sun, and in the long-term renewable burning—such as biodiesel—and the sun (with the help of parabolic power plants, for example), since in this way, in the very long-term und through the generated energy savings by replacement of steel, Aluminum and concrete by fiber reinforced natural stone, a state can be reached, where it will be possible in the long run to abandon primary energy from fossil burning.

By the combustion of regenerative burning materials, $CO_2$ will be fed to the growth of algae, which has been previously in the atmosphere and which now becomes—on the basis of the algae oil—carbon fiber, and thus is being derived into an essential part of building materials.

This process chain finally leads to reduction of $CO_2$ from the atmosphere, which is being sustainably removed from atmosphere, since the building material is a solid state body, that will not decompose in form of the carbon fiber, but remains permanently stable even after disposal due to its coal constituents.

In the end-stage of the process, the atmosphere will be withdrawn from $CO_2$ by the energy generation using biodiesel power plants and carbon-sequestration by just as much as necessary.

At the end of this possibly decades or even centuries-long lasting process, the energy sources driving this process chain can be replaced by clean renewable energy sources of solar energy using parabolic mirror technology.

Also the pyrolysis process necessary for the carbon fiber production can be supplied with the related necessary high temperatures to above 1400° C. by bundling of solar energy with help of parabolic mirror technology. In this way an industry can be built, that is based on $CO_2$-neutral or even $CO_2$-negative balances, without any need to abandon the necessary building and construction materials. The building material or a part of it respectively originates from the carbon itself, acting harmful in the atmosphere, and will be bound permanently within the building material, which will be discarded permanently bound underground after use or is being recycled accordingly.

BRIEF DESCRIPTION OF THE DRAWINGS

References are made, in the following text, to the accompanying drawings, in which.

Figure 1:
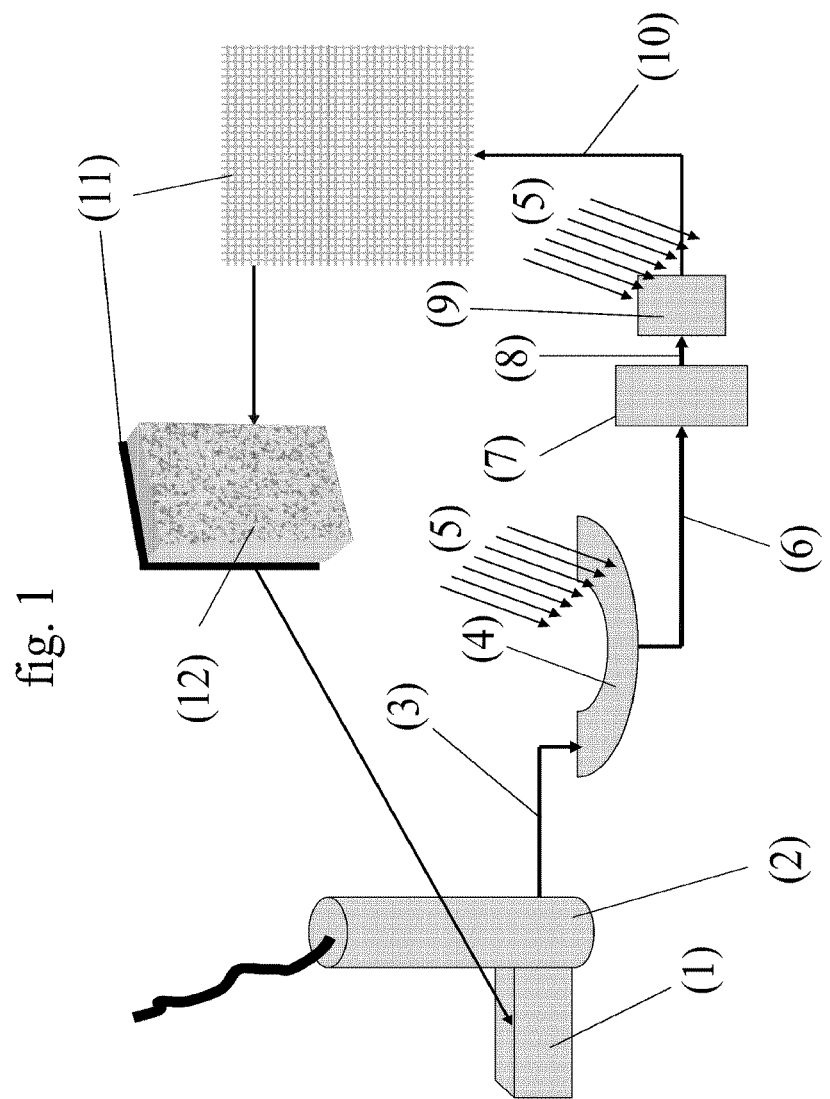
FIG. 1 is a procedural diagram.

One of the many possible implementations of the invention describes a material-chain or a substance chain circuit respectively with an arrangement of a conventional fossil burning (for example coal powered plant) fired power plant (1), whose exhaust gas separator (2) sequestrates the $CO_2$ (3) and intakes it into a salt water tank (4), in which algae (6) grow with the help of sunlight (5), which are being collected. From the algae (6) vegetable oil (8) is being obtained in oil-presses (7), which is being processed at first in production plants (9) to become synthetic fibers and then with help of sunray-bundling driven pyrolysis being processed into carbon fibers (10).

Woven fiber mats (11) are being produced from the carbon fibers.

The energy for the pyrolysis process for the carbonation of the fibers is being provided by the sunlight (5) with the help of parabolic mirror technology. These carbon fibers or carbon fiber mats (11) are being combined with low energy winnable pressure-resistant materials such as natural stone (12) to become hybrid building and construction materials.

The natural stone will be coated by the fibers with the help of epoxy resin, which is also being won from the algae oil, thus forming a $CO_2$-neutrally won building material, from which, for example, more power plants (1), buildings and vehicles can be built. The energy being needed for the cutting of the stone and the production processes of the fibers and resin will be provided by the power plant (1).

The conventional power plant (1) will be gradually replaced by power plants that are fired with renewable plant-based fuels instead of fossil burnings, in order to win the $CO_2$ which is being bound within the renewably growing fuels from the atmosphere, by capturing the $CO_2$ being bound in the renewable plant-fuels, in order to use it for the production of carbon fibers with help oft he algae growth. Hence valuable high performance tension stable building material is being derived from $CO_2$ previously bound within the atmosphere, whereas the carbon is permanently bound within the building material.

Figure 2:
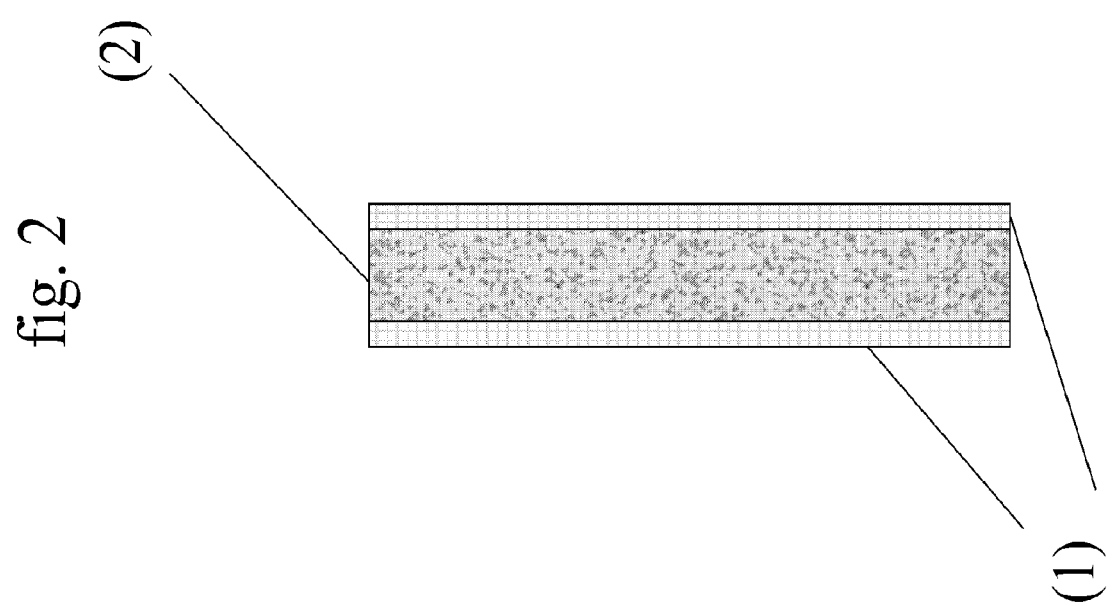
FIG. 2 is a cross section of a natural stone plate stabilized with carbon fibers.

FIG. 2 shows the cross section of a natural stone plate (2) being stabilized with carbon fibers (1), being produced on the basis of algae oil, for the construction of buildings, vehicles, ships and other industrial and consumer goods using stabilization methods of natural stone by fibrous material, also known as "stone composite technology" or CFS "carbon fiber stone" respectively, when the stone is being coated under preload of the carbon fibers.

Embodiments of the invention include a method for $CO_2$-emissions neutral, in a second step associated with a $CO_2$ emissions negative balance, production of pressure- and tension-stable building materials.

By the process of energy production by burning of fossil or renewable burning materials, rapid growth of algae is being stimulated by sequestration of $CO_2$, in order to utilize algae oil for the production of synthetic fibers, which are serving in particular for the production of carbon fibers to be further processed in such a way, that they are able to replace—in combination with natural stone for example—such $CO_2$—intensive building materials like concrete, steel, glass and aluminum.

The needed high temperatures for the production of carbon fibers will be generated in a $CO_2$-neutral manner by help of bundling of sun rays with the help of for example parabolic mirror technology.

This approach provides the fundamental basis for the formation of an initially $CO_2$-neutral, later in time $CO_2$-negative balance based further industrial development, in order to get control on and reverse global warming on Earth step by step over time.

What is claimed is:

1. A method for producing a building material, comprising:
   sequestering carbon dioxide from a power plant;
   discharging the sequestered carbon dioxide into a vessel containing algae;
   growing algae in the vessel through photosynthesis;
   subjecting the algae to an extraction process to produce algae oil;
   producing synthetic fibers from the extracted algae oil;
   processing the produced fibers into carbon fibers by sunray-bundling driven pyrolysis; and
   combining the carbon fibers with natural stone, cast stone, or concrete to form a building material.

2. A method according to claim 1, wherein the power plant comprises a fossil-fueled power plant, and the carbon dioxide is captured from exhaust gas of the power plant, so that said method is $CO_2$ neutral.

3. A method according to claim 2, wherein at least an even amount of carbon dioxide is bound from atmosphere during forming the building material than is released into the atmosphere.

4. A method according to claim 1, wherein the power plant burns a renewable fuel, and said method has a $CO_2$ emissions negative balance.

5. A method according to claim 1, wherein the power plant comprises a biodiesel-fueled power plant, and the carbon dioxide is captured from exhaust gas of the power plant, so that said method is $CO_2$ negative.

6. A method for producing a building material, comprising:
   introducing $CO_2$ into a vessel containing algae, said algae absorbing carbon;
   subjecting the algae to an oil extraction process to produce algae oil;
   producing synthetic fibers by processing the algae oil as a raw material;
   processing the synthetic fibers to carbon fibers by a pyrolysis process driven by bundled sunlight, wherein the sunlight is bundled, focused, and heats the fibers using parabolic mirror technology; and
   combining the carbon fibers with natural stone, cast stone, or concrete to form a building material,
   wherein the $CO_2$ is from burning of a renewable fuel, and said method has a $CO_2$ emissions negative balance, and wherein the renewable fuel comprises biodiesel.

7. A method according to claim 4, wherein the renewable fuel comprises biodiesel.

* * * * *